June 3, 1924.  
R. L. SAMPLE  
PIPE CONNECTION  
Filed Aug. 5, 1921
1,496,071
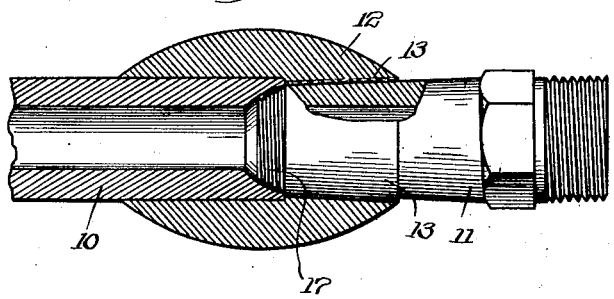
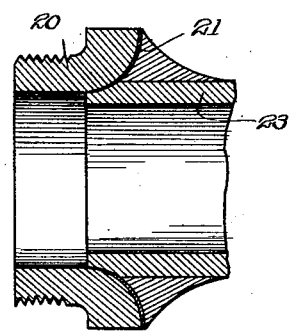
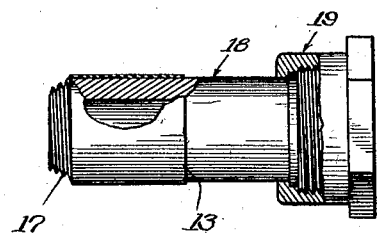
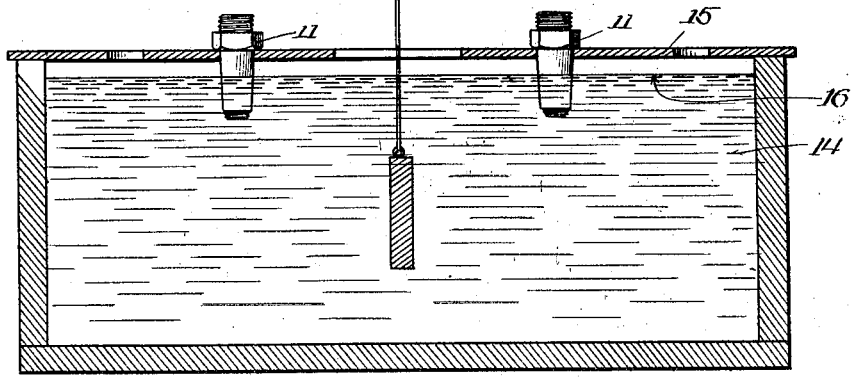
Inventor:  
Robert L. Sample Patented June 3, 1924.

1,496,071

UNITED STATES PATENT OFFICE.

ROBERT L. SAMPLE, OF CHICAGO, ILLINOIS.

PIPE CONNECTION.

Application filed August 5, 1921. Serial No. 489,985.

*To all whom it may concern:*

Be it known that I, ROBERT L. SAMPLE, a citizen of the United States, residing at Chicago, in the county of Cook and State of Illinois, have invented new and useful Improvements in Pipe Connections, of which the following is a full, clear, concise, and exact description, reference being had to the accompanying drawing, forming a part of this specification.

My invention relates to pipe connections, and more specifically to provisions for a "wiped" joint, between the ends of lead pipe and a tubular brass fitting.

One of the objects of my invention is to provide an improved tubular brass fitting (such as a nipple bushing, union connector, etc.) for connection with the end of the pipe (usually a lead pipe, though the connection may be made with pipes of other material, as tin, etc.) by means of a wiped joint, which fitting when manufactured is provided with a coating which will facilitate making of the wiped joint.

A further object of my invention is to provide an improved tubular brass fitting to be connected by a wiped joint to the end of a lead pipe, having a tapered threaded end, the lead being soft so that the threads on the brass fitting will cut into the material, whereby the fitting can thus be held in place in making the wiped joint without otherwise supporting the brass fitting.

A further object of my invention is to enable the making of a "wiped" joint which will do away with the weak section which at present is found at the point when the lead pipe is "belled" out.

Further objects will appear from the detailed description to follow and from the appended claims.

In the drawings in which my invention is illustrated:

Fig. 1 is a sectional view showing the brass fitting united to a lead pipe by wiped joint;

Fig. 2 is a part sectional, part elevational view showing a brass fitting provided with means to facilitate a wiped joint connection with a lead pipe;

Fig. 3 is a sectional view showing another form of brass fitting connected by wiped joint to a pipe;

Fig. 4 shows the apparatus used in providing the coating for the tubular brass fitting, which facilitates the making of the wiped joint connection.

Referring first to Fig. 1, the construction shown therein comprises the end of a lead pipe 10, a tubular brass nipple 11, and a wiped joint 12, between the lead pipe 10 and brass nipple 11. In order to cause the solder of the wiped joint 12 to adhere to the desired part of the nipple 11, I cause to be deposited on just the desired portion of the nipple 11, a coating 13, of pure tin. This coating may be deposited on the nipple by electroplating, immersing just that portion of the nipple which it is desired should be coated in an electroplating bath 14 (Fig. 4). The nipples 11 are placed in a suitable rack 15 (which may be the cover for bath) the level of the bath 16 being just the right height to cause just the right portion of the nipple to be electroplated. By this method, the wiped joint 12 is confined to just the right portion of the nipple 11, and will not extend beyond the portion of the nipple which is coated with tin as it will not adhere to the uncoated portion.

Another feature of my invention is that I further facilitate the making of the wiped joint by cutting a tapered thread on the end of the nipple, whereby the nipple may be screwed into the bell-mouth end of the lead pipe 10 and held thus in making the wiped joint. The end of the lead pipe 10 for this purpose may be chamfered out to make a conical portion to receive the conical threaded end of the nipple 17, the material of the lead pipe being soft so that it is not necessary to cut any threads, the threads on the nipple simply cutting their own threads in the bell-mouth end of the pipe. Heretofore in making wiped joints, it has been customary to block up the ends of the sections which were to be connected, to hold them in the proper position for making the wiped joint. By cutting the tapered thread on the end of the nipple, it could be screwed into the end of the soft lead pipe, with sufficient security to hold it for making the wiped joint.

Also heretofore in making wiped joints, it has been customary to expand the end of the lead pipe to permit the insertion of the end of the brass nipple. This expanding of the lead pipe caused a weakness in the wiped joint, as the solder just over the expanded portion of the pipe would be much thinner than the layer of solder at other parts, thus causing a very weak section of the solder, and consequently rendering it liable to breakage at this point. In my improved construction there is no necessity for expanding the lead pipe outwardly, and hence there is no weak section of the wiped joint.

The construction shown in Fig. 2 is quite similar to that shown in Fig. 1, except that the fitting 18 is provided with a union connection 19 at one end. Otherwise the construction of the brass fitting is the same as that shown in Fig. 1 including the coating of pure tin 13, and a tapered pipe threaded end at 17. The wiped joint connection with this fitting is made just as in the construction made in Fig. 1.

In Fig. 3 is shown a somewhat different form of brass fitting, in the form of a bushing 20, having its bell-mouth provided with a coating 21 of pure tin, to which the solder 22 of the wiped joint adheres, whereby the wiped joint can be easily effected between the brass bushing 20 and the end of the lead pipe 23.

As pointed out above, it will be seen that I have provided a brass fitting, which can be readily used in making a wiped joint connection with the lead pipe because of the fact that just the right portion of the fitting is provided with a coating of tin to which the solder of the wiped joint will readily adhere, whereby just the right amount of fitting will be covered by the solder of the wiped joint, and whereby the joint will be made of just the right size, and not unnecessarily large.

It will also be seen that in the construction shown in Figs. 1 and 2, by providing a tapered threaded connection on the brass fitting, and by reaming out the end of the lead pipe to a tapered form, a wiped joint connection is effected which is of unusual strength, as there is no weak section as in the usual wiped joint which has the end of the lead pipe belled out, causing a weak section in the solder of the wiped joint at this point. While I have shown three different forms of fitting embodying my invention, it is obvious that my invention can be applied to other forms, as covered and defined by the appended claims.

While I have described the pure tin coating as electrolytically deposited without the use of a flux, it may be deposited in other ways. For instance, it may be deposited by placing the desired portion of the article in a solution containing particles of tin and caustic soda or other chemical, and heating this solution to the boiling point. This creates an electrolytic action which causes a coating of pure tin to be deposited on the article. Due to the fact that the coating of tin deposited by the above outlined method is so pure, it follows that when this coating is heated by the application of solder, it will cause a perfect adhesion at every portion of the surface covered by the pure coating, avoiding the trouble which commonly occurs in the usual wiped joint, in which the coating is applied with the use of a flux, and in which when such coating is again heated by the application of solder in making a wiped joint a spluttering action of the flux is likely to take place preventing the solder from sticking.

Having thus described my invention, what I claim as new and desire to secure by Letters Patent is:

1. A pipe connection comprising a lead pipe, a tubular brass fitting provided with a coating of electrolytically deposited tin, and a wiped soldered connection between said tin and said lead pipe.

2. A tubular brass fitting provided with a coating of electrolytically deposited tin, whereby a wiped soldered connection may be made between said tin coating and a lead pipe.

3. A tubular brass fitting provided with a coating of electrolytically deposited tin, whereby a wiped soldered connection may be made between said tin coating and a lead pipe, said tin coating covering substantially only that part of the fitting to which the molten metal is to be applied in making the wiped joint, thereby facilitating making the wiped joint of the proper size.

In witness whereof, I have hereunto subscribed my name.

ROBERT L. SAMPLE.